United States Patent [19]
Degnan et al.

[11] Patent Number: 5,470,810
[45] Date of Patent: Nov. 28, 1995

[54] CATALYST AND METHOD OF MANUFACTURE

[75] Inventors: Thomas F. Degnan, Moorestown, N.J.;
Anthony S. Fung, Wilmington, Del.;
George H. Hatzikos, Mantua, N.J.;
Gordon J. Kennedy, Turnersville, N.J.;
Jocelyn A. Kowalski, Clarksboro, N.J.

[73] Assignee: Mobil Oil Corporation, Fairfax, Va.

[21] Appl. No.: 190,438

[22] Filed: Feb. 2, 1994

[51] Int. Cl.$^6$ ................................................. B01J 29/06
[52] U.S. Cl. ............................. 502/64; 502/67; 502/68
[58] Field of Search ................................. 502/64, 67, 68

[56] References Cited

U.S. PATENT DOCUMENTS

| | | | |
|---|---|---|---|
| 3,972,832 | 8/1976 | Butter et al. | 252/437 |
| 4,567,152 | 1/1986 | Pine | 502/64 |
| 4,584,091 | 4/1986 | Pine | 208/114 |
| 4,873,211 | 10/1989 | Walker et al. | 502/64 |
| 4,954,325 | 9/1990 | Rubin et al. | 423/328 |
| 4,983,276 | 1/1991 | Absil et al. | 208/120 |
| 5,039,640 | 8/1991 | Absil et al. | 502/67 |
| 5,085,762 | 2/1992 | Absil et al. | 208/120 |
| 5,110,776 | 5/1992 | Chitnis et al. | 502/64 |
| 5,151,394 | 9/1992 | Chitnis et al. | 502/65 |
| 5,190,902 | 3/1993 | Demmel | 502/63 |
| 5,231,064 | 7/1993 | Absil et al. | 502/68 |
| 5,232,579 | 8/1993 | Absil et al. | 208/113 |
| 5,232,580 | 8/1993 | Le et al. | 208/114 |

*Primary Examiner*—P. Achutamurthy
*Attorney, Agent, or Firm*—Alexander J. McKillop; Dennis P. Santini; Gerald L. Harris

[57] ABSTRACT

This invention relates to the catalyst composition resulting from the addition of phosphorus, and optionally, a matrix material, to a porous crystalline material having the structure of MCM-22, along with the method for making the catalyst composition, and the method for using the catalyst composition in catalytic cracking. It is desirable to improve the hydrothermal stability of the catalysts which are based upon porous crystalline materials having the X-ray structure of MCM-22 to increase the activity that the catalyst maintains after repeated cycles of steaming such as is experienced in the FCC process. It has been found that phosphorus addition to a porous crystalline material having the structure of MCM-22 improves the hydrothermal stability of the resulting catalyst. This improved catalyst is useful in organic conversion processes, e.g., catalytic cracking processes.

24 Claims, 1 Drawing Sheet

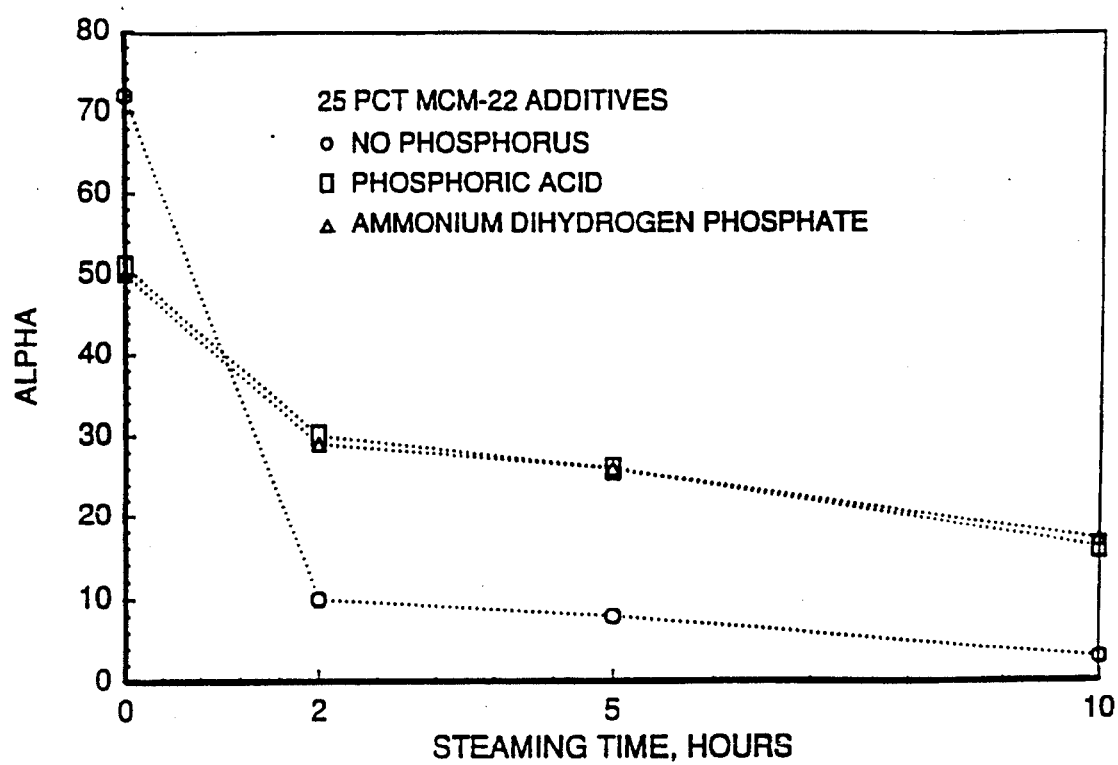

5,470,810

CATALYST AND METHOD OF MANUFACTURE

FIELD OF THE INVENTION

This invention relates to the catalyst composition resulting from the addition of phosphorus, and optionally, a matrix material, to a porous crystalline material having the X-ray diffraction characteristics shown in Table 1 of the specification, a preferred form of which is MCM-22, along with the method for making the catalyst composition, and the method for using the catalyst composition in catalytic cracking processes.

BACKGROUND OF THE INVENTION

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIA element oxide, e.g. $AlO_4$, in which the tetrahedra are cross-linked by the sharing of oxygen atoms whereby the ratio of the total Group IIIA element, e.g. aluminum, and silicon atoms to oxygen atoms is 1:2. The electrovalence of the tetrahedra containing the Group IIIA element, e.g. aluminum, is balanced by the inclusion in the crystal of a cation, for example an alkali metal or an alkaline earth metal cation. This can be expressed wherein the ratio of the Group IIIA element, e.g. aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

The catalytic cracking of hydrocarbon oils using zeolites is a known process, practiced, for example, in fluid-bed catalytic cracking (FCC) units, moving bed or Thermofor Catalytic Cracking (TCC) reactors and fixed bed crackers. Zeolites have been found to be particularly effective for the catalytic cracking of a gas oil to produce motor fuels and have been described and claimed in many patents including U.S. Pat. Nos. 3,140,249; 3,140,251; 3,140,252; 3,140,253; and 3,271,418. It is also known in the art to incorporate the crystalline zeolite into a matrix for catalytic cracking and such disclosure appears in one or more of the above-identified U.S. patents.

Crystalline materials having the X-ray structure of MCM-22 are useful in catalytic cracking to increase the total gasoline yield and octane, see U.S. Pat. Nos. 4,983,276 and 5,039,640, herein incorporated by reference.

It is desirable to improve the hydrothermal stability of the catalysts which are based upon porous crystalline materials having the X-ray diffraction pattern shown in Table 1 of the specification to increase the activity that the catalyst maintains after repeated cycles of steaming such as is experienced in the FCC process.

SUMMARY OF THE INVENTION

In accordance with the present invention, there has now been discovered an improved catalyst which is useful in organic conversion processes, such as catalytic cracking processes, where the improved catalyst of this invention is useful in upgrading total yield and octane number of the gasoline boiling range product.

The desirable results identified above are obtained by the use of a catalyst composition under suitable organic conversion conditions, said catalyst composition comprising a synthetic porous crystalline material characterized by an X-ray diffraction pattern including values substantially as set forth in Table 1 of the specification, said porous crystalline material having been contacted with a source of phosphorus. Also provided in this invention is a method for manufacture of this catalyst composition comprising modifying a porous crystalline material characterized by an X-ray diffraction pattern including values substantially as set forth in Table 1 of the specification by contacting the porous crystalline material with a source of phosphorus and then forming catalyst particles from the phosphorus modified material. A matrix material may also be added to the catalyst composition of this invention and the phosphorus may be added to either the porous crystalline material, the matrix material or both materials. Also the catalyst composition of this invention may be admixed with a large pore crystalline molecular sieve or mesoporous material. The improved catalyst of this invention may be used in organic conversion processes, such as catalytic cracking processes.

BRIEF DESCRIPTION OF THE DRAWING

The figure is a graph showing the effect of phosphorus addition on the alpha activity of MCM-22 catalysts.

DETAILED DESCRIPTION

The porous crystalline material which is included in the catalyst composition of the present invention is identified in this specification as one having X-ray diffraction characteristics including those shown in Table 1, a preferred example of which is MCM-22. MCM-22 and the synthesis thereof are described in U.S. Pat. No. 4,954,325, the entire disclosure of which is expressly incorporated herein by reference.

As mentioned earlier, crystalline materials having the X-ray structure of MCM-22 are useful in organic conversion processes, e.g., hydrocarbon conversion. For example, these materials may be used in catalytic cracking to increase the total gasoline yield and octane, see U.S. Pat. Nos. 4,983,276 and 5,039,640, herein incorporated by reference.

The present invention concerns a composition comprising a porous crystalline material characterized by an X-ray diffraction pattern including values substantially as set forth in Table 1 of the specification, said porous crystalline material having been contacted with a source of phosphorus. The composition may further comprise at least one matrix material, non-limiting examples of which include at least one of clay, alumina, silica and mixtures thereof. Either the porous crystalline material, the matrix material, or both may be contacted with the source of phosphorus.

One embodiment of the present invention is a method for manufacture of a composition comprising the steps of modifying a porous crystalline material characterized by an X-ray diffraction pattern including values substantially as set forth in Table 1 of the specification by contacting said porous crystalline material with a source of phosphorus and forming a catalyst particle from the phosphorus modified porous crystalline material.

Another embodiment of the present invention is a method for manufacture of a composition comprising the steps of combining a porous crystalline material characterized by an X-ray diffraction pattern including values substantially as set forth in Table 1 of the specification and a source of phosphorus and at least one of a source of clay, a source of silica, a source of alumina, and mixtures thereof, and forming catalyst particles from said combination.

A more specific embodiment of this invention is a method for manufacture of a composition comprising the steps of preparing a slurry of a porous crystalline material characterized by an X-ray diffraction pattern including values substantially as set forth in Table 1 of the specification, then blending a source of clay into the slurry, then adding a source of phosphorus to the slurry, then adding a source of silica and a source of alumina to the slurry, and finally forming catalyst particles from the slurry. The phosphorus may be added to any one or all of the slurries used to make the product. The phosphorus may also be added to the formed particle or to any particle used in the composition.

Non-limiting examples of the source of phosphorus useful in the present invention include ammonium monohydrogen phosphate, ammonium dihydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite, phosphoric acid and mixtures thereof, more specifically phosphoric acid and ammonium dihydrogen phosphate, and most specifically, phosphoric acid. The phosphorus is typically added in an amount sufficient to yield a concentration of at least 0.1 wt. % on the finished catalyst.

Non-limiting examples of materials useful in this invention include kaolin clay as the source of clay, phosphoric acid or ammonium dihydrogen phosphate as the source of phosphorus, colloidal silica as the source of silica, and pseudoboehmite alumina as the source of alumina. Preferably, the catalyst should be formed and dried as rapidly as possible after mixing.

The composition of this invention may be useful in catalytic cracking, either alone, combined with a matrix, combined with a large pore crystalline molecular sieve, which is itself catalytically active, combined with a mesoporous material, or with combinations of the above.

The large pore (e.g., greater than about 7 Angstroms) crystalline molecular sieve which may be used is a material normally having a Constraint Index (as defined in U.S. Pat. No. 4,016,218, incorporated by reference herein) less than 1. Large pore crystalline molecular sieves are well known in the art and include faujasite, mordenite, zeolite X, rare-earth exchanged zeolite X (REX), zeolite Y, zeolite Y (HY), rare earth-exchanged ultra stable zeolite Y (RE-USY), dealuminized Y (DAY), ultrahydrophobic zeolite Y (UHP-Y), dealuminized silicon enriched zeolites such as LZ-210, zeolite ZK-5, zeolite ZK-4, zeolite Beta, zeolite Omega, zeolite L, ZSM-20 and other natural or synthetic zeolites.

Other large pore crystalline molecular sieves which are useful herein include pillared silicates and/or clays; aluminophosphates, e.g., ALPO4-5, VPI-5; silicoaluminophospates, e.g., MCM-9, SAPO-5, SAPO-37, SAPO-31, SAPO-40, SAPO-41; and other metal aluminophosphates. These materials are variously described in U.S. Pat. Nos. 4,440,871; 4,554,143; 4,567,029; 4,666,875; 4,742,033.

The mesoporous materials useful in the present invention include crystals having uniform pores within the range of from about 13 Å A to about 200 Å in diameter, more usually from about 15 Å to about 100 Å. Since these pores are significantly larger than those of other crystalline materials, it is also appropriate to refer to them as ultra-large pore size materials. For the purposes of this application, a working definition of "porous" is a material that absorbs at least 1 gram of a small molecule, such as Ar, $N_2$, n-hexane, or cyclohexane, per 100 grams of solid. Non-limiting examples of mesoporous material are MCM-41 and MCM-48, which are substantially described in U.S. Pat. Nos. 5,098,684; 5,102,643; 5,198,203. These mesoporous materials are useful in catalytic cracking processes as disclosed in U.S. Pat. No. 5,232,580.

Examples of porous crystalline materials useful in this invention include the PSH-3 composition of U.S. Pat. No. 4,439,409, incorporated herein by reference. Another crystalline material of this type is the synthetic zeolite MCM-22.

Zeolite MCM-22 has a chemical composition expressed by the molar relationship:

$$X_2O_3:(n)YO_2,$$

where X is a trivalent element, such as aluminum, boron, iron and/or gallium, preferably aluminum, Y is a tetravalent element such as silicon and/or germanium, preferably silicon, and n is at least about 10, usually from about 10 to about 150, more usually from about 10 to about 60, and even more usually from about 20 to about 40. In the as-synthesized form, zeolite MCM-22 has a formula, on an anhydrous basis and in terms of moles of oxides per n moles of $YO_2$, as follows:

$$(0.005-0.1)Na_2O:(1-4)R:X_2O_3:nYO_2$$

where R is an organic component. The Na and R components are associated with the zeolite as a result of their presence during crystallization, and are easily removed by the post-crystallization methods described below.

Zeolite MCM-22 is thermally stable and exhibits a high surface area greater than about 400 $m^2$/gm as measured by the BET (Bruenauer, Emmet and Teller) test and unusually large sorption capacity when compared to previously described crystal structures having similar X-ray diffraction patterns. As is evident from the above formula, MCM-22 is synthesized nearly free of Na cations and thus possesses acid catalysis activity as synthesized. It can, therefore, be used as a component of the catalyst composition herein without having to first undergo an ion exchange step. To the extent desired, however, the original sodium cations of the as-synthesized material can be replaced at least in part by established techniques including ion exchange with other cations. Preferred replacement cations include metal ions, hydrogen ions, hydrogen precursor ions, e.g., ammonium and mixtures of such ions. Particularly preferred cations are those which tailor the activity of the catalyst for cracking. These include hydrogen, rare earth metals and metals of Groups IIA, IIIA, IVA, IB, IIB, IIIB, IVB, and VIII of the Periodic Table of the Elements. In its calcined form, the porous crystalline material useful in this invention is characterized by a specific X-ray diffraction pattern including the lines listed in Table 1, below.

TABLE 1

| Interplanar d-Spacing (Å) | Relative Intensity, I/I$_o$ × 100 |
|---|---|
| 12.36 ± 0.4 | M-VS |
| 11.03 ± 0.2 | M-S |
| 8.83 ± 0.14 | M-VS |
| 6.18 ± 0.12 | M-VS |
| 6.00 ± 0.10 | W-M |
| 4.06 ± 0.07 | W-S |
| 3.91 ± 0.07 | M-VS |
| 3.42 ± 0.06 | VS |

Alternatively, it may be characterized by an X-ray diffraction pattern in its calcined form including the following lines shown in Table 2 below:

TABLE 2

| Interplanar d-Spacing (Å) | Relative Intensity, I/I$_o$ × 100 |
|---|---|
| 30.0 ± 2.2 | W-M |
| 22.1 ± 1.3 | W |
| 12.36 ± 0.4 | M-VS |
| 11.03 ± 0.2 | M-S |
| 8.83 ± 0.14 | M-VS |
| 6.18 ± 0.12 | M-VS |
| 6.00 ± 0.10 | W-M |
| 4.06 ± 0.07 | W-S |
| 3.91 ± 0.07 | M-VS |
| 3.42 ± 0.06 | VS |

More specifically, the calcined form may be characterized by an X-ray diffraction pattern including the following lines shown in Table 3 below:

TABLE 3

| Interplanar d-Spacing (Å) | Relative Intensity, I/I$_o$ × 100 |
|---|---|
| 12.36 ± 0.4 | M-VS |
| 11.03 ± 0.2 | M-S |
| 8.83 ± 0.14 | M-VS |
| 6.86 ± 0.14 | W-M |
| 6.18 ± 0.12 | M-VS |
| 6.00 ± 0.10 | W-M |
| 5.54 ± 0.10 | W-M |
| 4.92 ± 0.09 | W |
| 4.64 ± 0.08 | W |
| 4.41 ± 0.08 | W-M |
| 4.25 ± 0.08 | W |
| 4.10 ± 0.07 | W-S |
| 4.06 ± 0.07 | W-S |
| 3.91 ± 0.07 | M-VS |
| 3.75 ± 0.06 | W-M |
| 3.56 ± 0.06 | W-M |
| 3.42 ± 0.06 | VS |
| 3.30 ± 0.05 | W-M |
| 3.20 ± 0.05 | W-M |
| 3.14 ± 0.05 | W-M |
| 3.07 ± 0.05 | W |
| 2.99 ± 0.05 | W |
| 2.82 ± 0.05 | W |
| 2.78 ± 0.05 | W |
| 2.68 ± 0.05 | W |
| 2.59 ± 0.05 | W |

Most specifically, it may be characterized in its calcined form by an X-ray diffraction pattern including the following lines shown in Table 4 below:

TABLE 4

| Interplanar d-Spacing (Å) | Relative Intensity, I/I$_o$ × 100 |
|---|---|
| 30.0 ± 2.2 | W-M |
| 22.1 ± 1.3 | W |
| 12.36 ± 0.4 | M-VS |
| 11.03 ± 0.2 | M-S |
| 8.83 ± 0.14 | M-VS |
| 6.86 ± 0.14 | W-M |
| 6.18 ± 0.12 | M-VS |
| 6.00 ± 0.10 | W-M |
| 5.54 ± 0.10 | W-M |
| 4.92 ± 0.09 | W |
| 4.64 ± 0.08 | W |
| 4.41 ± 0.08 | W-M |
| 4.25 ± 0.08 | W |
| 4.10 ± 0.07 | W-S |
| 4.06 ± 0.07 | W-S |
| 3.91 ± 0.07 | M-VS |
| 3.75 ± 0.06 | W-M |
| 3.56 ± 0.06 | W-M |
| 3.42 ± 0.06 | VS |
| 3.30 ± 0.05 | W-M |
| 3.20 ± 0.05 | W-M |
| 3.14 ± 0.05 | W-M |
| 3.07 ± 0.05 | W |
| 2.99 ± 0.05 | W |
| 2.82 ± 0.05 | W |
| 2.78 ± 0.05 | W |
| 2.68 ± 0.05 | W |
| 2.59 ± 0.05 | W |

These values were determined by standard techniques. The radiation was the K-alpha doublet of copper and a diffractometer equipped with a scintillation counter and an associated computer was used. The peak heights, I, and the positions as a function of 2 theta, where theta is the Bragg angle, were determined using algorithms on the computer associated with the diffractometer. From these, the relative intensities, 100 I/I$_o$, where I$_o$ is the intensity of the strongest line or peak, and d (obs.) the interplanar spacing in Angstrom Units (Å), corresponding to the recorded lines, were determined. In Tables 1–4, the relative intensities are given in terms of the symbols W=weak, M=medium, S=strong, VS=very strong. In terms of relative intensities, these may be generally designated as follows:

W=0–20
M=20–40
S=40–60
VS=60–100

These X-ray diffraction patterns are characteristic of all species of the zeolite. The sodium form as well as other cationic forms reveal substantially the same pattern with some minor shifts in interplanar spacing and variation in relative intensity. Other minor variations can occur depending on the ratio of structural components, e.g. silicon to aluminum mole ratio of the particular sample, as well as its degree of thermal treatment.

Prior to use as a catalyst, the zeolite crystals should be subjected to thermal treatment to remove part or all of any organic constituent present in the as-synthesized material.

The zeolite in its as-synthesized form containing organic cations as well as when it is in its ammonium form, can be converted to another form by thermal treatment. This thermal treatment is generally performed by heating one of these forms at a temperature of at least about 370° C. for at least 1 minute and generally not longer than 20 hours. While subatmospheric pressure can be employed for the thermal treatment, atmospheric pressure is preferred simply for reasons of convenience. The thermal treatment can be performed at a temperature of up to a limit imposed by the irreversible thermal degradation of the crystalline structure of the zeolite, typically up to about 925° C.

Although neither the cracking catalyst nor the additive catalyst need be steamed prior to use in the present process, and, in fact, are typically not steamed prior to use herein, they may be steamed at a temperature of from about 300° C. to about 800° C. for a time of from about 1 to about 200 hours in about 5 to about 100% steam.

The stability of the zeolite catalyst may be increased by steaming, with suitable steam stabilization conditions typically including contacting the catalyst with, e.g., 5–100% steam at a temperature of at least about 300° C. (e.g., 300°–650° C.) for at least one hour (e.g., 1–200 hours) at a pressure of 100–2,500 kPa. In a more particular embodiment, the catalyst can be made to undergo steaming with 75–100% steam at 315°–500° C. and atmospheric pressure for 2–25 hours.

Prior to its use in catalytic cracking, zeolite MCM-22 crystals can be at least partially dehydrated. This can be achieved by heating the zeolite crystals to a temperature in the range of from about 100° C. to about 595° C. in an atmosphere such as air, nitrogen, etc., and at atmospheric, subatmospheric, or superatmospheric pressures for between about 30 minutes to about 48 hours. Dehydration can also be performed at room temperature merely by placing the crystalline material in a vacuum, but a longer time is required to obtain a sufficient amount of dehydration.

The zeolite employed in the catalyst of this invention may be used in its as-synthesized form (i.e. still in contact with its organic directing agent, e.g., hexametheleneimine), a nitrogen precalcined form, or a hybrid calcined form (e.g., precalcined with nitrogen and then calcined in air).

Zeolite MCM-22 can be prepared from a reaction mixture containing sources of alkali or alkaline earth metal (M), e.g., sodium or potassium, cation, an oxide of trivalent element X, e.g, aluminum, an oxide of tetravalent element Y, e.g., silicon, an organic (R) directing agent, described below, and water. The reaction mixture has a composition, in terms of mole ratios of oxides, within the following ranges:

| Reactants | Useful | Preferred |
| --- | --- | --- |
| $YO_2/X_2O_3$ | 10–60 | 10–40 |
| $H_2O/YO_2$ | 5–100 | 10–50 |
| $OH^-/YO_2$ | 0.01–1.0 | 0.1–0.5 |
| $M/YO_2$ | 0.01–2.0 | 0.1–1.0 |
| $R/YO_2$ | 0.05–1.0 | 0.1–0.5 |

The organic directing agent for use in synthesizing zeolite MCM-22 from the above reaction mixture is hexamethyleneimine.

In a preferred method of synthesizing zeolite MCM-22, the $YO_2$ reactant contains a substantial amount of solid $YO_2$, e.g., at least about 30 wt. % solid $YO_2$. Where $YO_2$ is silica, the use of a silica source containing at least about 30 wt. % solid silica, e.g., Ultrasil (a precipitated, spray dried silica containing about 90 wt. % silica) or HiSil (a precipitated hydrated $SiO_2$ containing about 87 wt. % silica, about 6 wt. % free $H_2O$ and about 4.5 wt. % bound $H_2O$ of hydration and having a particle size of about 0.02 micron) favors crystal formation from the above mixture. If another source of oxide of silicon, e.g., Q-Brand (a sodium silicate comprised of about 28.8 wt. % of $SiO_2$, 8.9 wt. % $Na_2O$ and 62.3 wt. % $H_2O$) is used, crystallization may yield little if any MCM-22 crystalline material and impurity phases of other crystal structures, e.g., ZSM-12, may be produced. Preferably, therefore, the $YO_2$, e.g., silica, source contains at least about 30 wt. % solid $YO_2$, e.g., silica, and more preferably at least about 40 wt. % solid $YO_2$, e.g., silica.

Crystallization of the MCM-22 crystalline material can be carried out at either static or stirred conditions in a suitable reactor vessel such as, e.g., polypropylene jars or teflon-lined or stainless steel autoclaves. The total useful range of temperatures for crystallization is from about 80° C. to about 225° C. for a time sufficient for crystallization to occur at the temperature used, e.g., from about 25 hours to about 230 days, after which the crystals are separated from the liquid and recovered.

The reaction mixture components can be supplied by more than one source. The reaction mixture can be prepared either batchwise or continuously. Crystal size and crystallization time of the MCM-22 crystalline material will vary with the nature of the reaction mixture employed and the crystallization conditions.

In all cases, synthesis of the MCM-22 crystals is facilitated by the presence of at least about 0.01 percent, preferably about 0.10 percent and still more preferably about 1 percent, seed crystals (based on total weight of the crystalline product formed).

The zeolite crystals can be shaped into a wide variety of particle sizes. Generally speaking, the particles can be in the form of a powder, a granule, or a molded product such as an extrudate having a particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

Any or all of the porous crystalline material, the large pore crystalline molecular sieve, and the mesoporous material may be composited with another material which is resistant to the temperatures and other conditions employed in the organic conversion process of this invention. Such materials include active and inactive materials and other synthetic or naturally occurring porous crystalline molecular sieves as well as inorganic materials such as clays and/or oxides such as alumina, silica or silica-alumina. The latter may be either naturally occurring or in the form of gelatinous precipitates or gels including mixtures of silica and metal oxides.

Naturally occurring clays which can be used as matrix materials with any or all catalyst components herein include the montmorillonite and kaolin family, which families include the subbentonites, and the kaolins commonly known as Dixie, McNamee, Georgia, and Florida clays or others in which the main mineral constituent is halloysite, kaolinite, dickite, nacrite, or anauxite. Such clays can be used in the raw state as originally mined or initially subjected to calcination, acid treatment or chemical modification.

In addition to the foregoing materials, either or both catalyst components can be composited with one or more porous matrix materials such as silica, alumina, silica-alumina, silica-magnesia, silica-zirconia, silica-thoria, silica-berylia, silica-titania, as well as ternary oxide compositions such as silica-alumina-thoria, silica-alumina-zirconia, silica-alumina-magnesia, silica-magnesia-zirconia, and the like. It may also be advantageous to provide at least a part of the foregoing matrix materials in colloidal form so as to facilitate extrusion of the bound catalyst component(s).

The relative proportions of catalyst component(s) and matrix can vary widely with the content of the former ranging from about 1 to about 95 percent by weight, and more usually from about 10 to about 70 weight percent, of the composite. The large pore crystalline cracking catalyst component, the mesoporous material and the porous crystalline material can be independently composited with the same or different matrix material or all of these materials can be incorporated together in the same matrix material.

The amount of the porous crystalline material which is added to the large pore or mesoporous crystalline cracking catalyst component may vary from cracking unit to cracking unit depending upon the desired octane number, total gasoline yield required, the nature of the available feedstock and other similar factors. For many cracking operations, the weight percent of the porous crystalline material (e.g., MCM22) relative to the total quantity of catalyst composition can range from about 0.1 to about 90 wt. %, specifically from about 1 to about 75 wt. %, more specifically from about 2 to about 50 wt. %., and most specifically from about 4 to about 25 wt. %.

As mentioned earlier, the catalyst composition of this invention is useful as a catalyst for organic compound, e.g., hydrocarbon compound, conversion. Non-limiting examples of processes for organic compound conversion include Fluid Catalytic Cracking (FCC) and other forms of catalytic cracking including moving bed catalytic cracking and hydrocracking.

Suitable catalytic cracking conditions include a temperature ranging from about 700° F. to about 1300° F. and a pressure ranging from subatmospheric to several hundreds of atmospheres. The catalytic cracking process can be either fixed bed, moving bed, transfer line, or fluidized bed, and the hydrocarbon flow may be either concurrent or countercurrent to the catalyst flow. The process of the invention is particularly applicable to the Fluid Catalytic Cracking (FCC) or Thermofor Catalytic Cracking (TCC) processes. In both of these processes, the hydrocarbon feed and catalyst are passed through a reactor and the catalyst is regenerated. The two processes differ substantially in the size of the catalyst particles and in the engineering contact and transfer which is at least partially a function of catalyst size.

The TCC process is a moving bed and the catalyst is in the shape of pellets or beads having an average particle size of about one-sixty-fourth to one-fourth inch. Active, hot catalyst beads progress downwardly cocurrent with a hydrocarbon charge stock through a cracking reaction zone. The hydrocarbon products are separated from the coked catalyst and recovered, and the catalyst is recovered at the lower end of the zone and regenerated.

Typical TCC conversion conditions include an average reactor temperature of from about 450° C. to about 540° C.; catalyst/oil volume ratio of from about 2 to about 7; reactor volume hourly space velocity of from about 1 to about 5 vol./hr./vol.; and recycle to fresh feed ratio of from 0 to about 0.5 (volume).

The process of the invention is also applicable to Fluid Catalytic Cracking (FCC). In fluidized catalytic cracking processes, the catalyst is a fine powder of about 10 to 200 microns. This powder is generally suspended in the feed and propelled upward in a reaction zone. A relatively heavy hydrocarbon feedstock, e.g., a gas oil, is admixed with a suitable cracking catalyst to provide a fluidized suspension and cracked in an elongated reactor, or riser, at elevated temperatures to provide a mixture of lighter hydrocarbon products. The gaseous reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbons from the spent catalyst prior to conveying the latter to a catalyst regenerator unit, an inert stripping gas, e.g., steam, is passed through the catalyst bed where it desorbs such hydrocarbons conveying them to the product recovery zone. The fluidizable catalyst is continuously circulated between the riser and the regenerator and serves to transfer heat from the latter to the former thereby supplying the thermal needs of the cracking reaction which is endothermic.

The FCC conversion conditions include a riser top temperature of from about 500° C. to about 595° C., specifically from about 520° C. to about 565° C., and most specifically from about 530° C. to about 550° C.; catalyst/oil weight ratio of from about 3 to about 12, specifically from about 4 to about 11, and most specifically from about 5 to about 10; and catalyst residence time of from about 0.5 to about 15 seconds, specifically from about 1 to about 10 seconds.

It is generally necessary that the catalysts be resistant to mechanical attrition, that is, the formation of fines which are small particles, e.g., less than 20 µm. The cycles of cracking and regeneration at high flow rates and temperatures, such as in an FCC process, have a tendency to break down the catalyst into fines, as compared with an average diameter of catalyst particles of about 60–100 microns. In an FCC process, catalyst particles range from about 10 to about 200 microns, preferably from about 20 to 150 microns. Excessive generation of catalyst fines increases the refiner's catalyst costs.

The feedstock, that is, the hydrocarbons to be cracked, may include in whole or in part, a gas oil (e.g., light, medium, or heavy gas oil) having an initial boiling point above about 204° C., a 50% point of at least about 260° C., and an end point of at least about 315° C. The feedstock may also include deep cut gas oil, vacuum gas oil, thermal oil, residual oil, cycle stock, whole top crude, tar sand oil, shale oil, synthetic fuel, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 400° C. must be carried out under vacuum in order to avoid thermal cracking. The boiling temperatures utilized herein are expressed in terms of convenience of the boiling point corrected to atmospheric pressure. Resids or deeper cut gas oils having an end point of up to about 700° C., even with high metals contents, can also be cracked using the invention.

EXAMPLES

Catalysts of this invention and comparative catalysts were prepared and tested to determine the alpha value ($\alpha$) of the catalysts. When alpha value is examined, it is noted that the alpha value is an approximate indication of the catalytic cracking activity of the catalyst compared to a standard catalyst and it gives the relative rate constant (rate of normal hexane conversion per volume of catalyst per unit time). It is based on the activity of silica-alumina cracking catalyst taken as an alpha of 1 (rate constant is 0.016 sec$^{-1}$). The alpha test is described in U.S. Pat. No. 3,354,078; in the *Journal of Catalysis*, Vol. 4, p 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395. The higher alpha values correspond with a more active cracking catalyst.

When ion-exchange capacity and temperature of the maximum rate of ammonia desorption are examined, they are determined by titrating, with a solution of sulfamic acid, the gaseous ammonia evolved during the temperature-programmed decomposition of the ammonium-form of the zeolite or its phosphorus incorporated form (TPAD). The basic method is described in *Thermochimica Acta*, Vol. III, pp. 113–124, 1971, by G. T. Kerr and A. W. Chester, incorporated by reference herein as to that description.

The 130.3 Mhz $^{27}$Al nuclear magnetic resonance (NMR) quantitative data were obtained using 1.5 µs pulses with the solution 90°=9.0 µs and a 100 ms recycle. The method is similar to that described in Klinowski, J., Thomas, J. M., Fyfe, C. A., Gobbi, G. C., and Hartman, J. S., *Inorg. Chem.*, 22 (1983) 63.

Whenever sorption data are set forth for comparison of sorptive capacities for water, cyclohexane and/or n-hexane, they are Equilibrium Adsorption values determined as follows:

A weighed sample of the calcined adsorbent was contacted with the desired pure adsorbate vapor in an adsorbent chamber, evacuated to less than 1 mm Hg and contacted with 12 Torr of water vapor or 40 Torr of n-hexane or 40 Torr of cyclohexane vapor, pressures less than the vapor-liquid equilibrium pressure of the respective adsorbate at 90° C. The pressure was kept constant (within about ±0.5 mm Hg) by addition of adsorbate vapor controlled by a manostat during the adsorption period, which did not exceed about 8 hours. As adsorbate was adsorbed by the MCM-22 crystalline material, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbent. Before phosphorus addition, zeolite MCM-22 exhibits equilibrium adsorption values than about 10 wt. % for water vapor, greater than about 4.5 wt. %, usually greater than about 7 wt. % for cyclohexane vapor and greater than about 10 wt. % for n-hexane vapor. These vapor sorption capacities are a notable distinguishing feature of MCM-22.

Catalysts of this invention were prepared and tested for attrition resistance as represented by an Attrition Index (AI). The Attrition Index is defined as the weight percentage of the fines generated during the test that are 20 microns or less in size relative to the amount of material larger than 20 microns present before the test. In the test, a 7 cc catalyst sample is contacted in a 1 inch (inside diameter) U-tube with an air jet formed by humidified (60%) air through an 0.07 inch nozzle at 21 liters per minute for one hour.

$$AI = 100 * \frac{\text{wt. \% fines } AA - \text{wt. \% fines } BA}{100 - \text{wt. \% fines } BA}$$

where BA is before attrition test and AA is after attrition test. The lower the Attrition Index, the more attrition resistant is the catalyst.

Example 1

MCM-22, synthesized according to U.S. Pat. No. 4,954,325, was calcined at 900° F. in nitrogen for 3 hours and then in air at 1,000° F. for 9 hours. MCM-22 was then ammonium exchanged, dried at 250° F. and air calcined at 1,000° F. for 3 hours. The resulting catalyst is designated Catalyst A and has the following properties:

| | |
|---|---|
| Phosphorus content, Wt. % | 0 |
| Alpha activity | 280 |
| TPAD | 0.63 meq NH$_3$/g |
| Td Al$_2$O$_3$, wt. %, $^{27}$Al NMR | 3.2 |

A sample prepared similarly to that of Example 1 was contacted with an aqueous solution of ammonium dihydrogen phosphate to incorporate a nominal 1 wt. % phosphorus, dried at 250° F. and calcined in air at 1,000° F. for 3 hours. It was then steamed at 1,000° F. for 2.5 hours. The resulting catalyst is designated Catalyst B and has the following properties:

| | |
|---|---|
| Phosphorus content, Wt. % | 1 |
| Alpha activity | 154 |
| TPAD | 0.22 meq NH$_3$/g |
| Td Al$_2$O$_3$, wt. %, $^{27}$Al NMR | 2.1 |

The catalyst of Example 2 showed a reduction of 45% in alpha activity, 65% in TPAD value, and 34% in $^{27}$Al NMR value after steaming.

Example 3

A sample of the catalyst prepared in Example 1 above was steamed at 1,000° F. for 2.5 hours. The catalyst was not contacted with phosphorus before steaming. The resulting catalyst is designated Catalyst C and has the following properties:

| | |
|---|---|
| Phosphorus content, Wt. % | 0 |
| Alpha activity | 72 |
| TPAD | 0.15 meq NH$_3$/g |
| Td Al$_2$O$_3$, wt. %, $^{27}$Al NMR | 1.6 |

The catalyst of Example 3 showed a decrease of 74% in alpha activity, 76% in TPAD, and 50% in $^{27}$Al NMR value after steaming. Examples 2 and 3 show that incorporation of phosphorus improves retention of framework aluminum and, correspondingly cracking activity, in steamed catalysts.

Example 4

A phosphorus modified fluid catalyst containing 25 wt. % zeolite MCM-22 was prepared by first making a slurry of zeolite MCM-22, synthesized according to U.S. Pat. No. 4,954,325. The zeolite slurry was prepared by calcining zeolite MCM-22 for 3 hours at 900° F. and then ballmilling the calcined zeolite for 16 hours at 25% solids with deionized water (DI) and using 0.6 wt. % dispersant (Marasperse N-22, Reed-Lignin, Inc., Greenwich, Conn.). Kaolin clay (Kaopaque 10S, a Georgia kaolin clay, Dry Branch Chemical Co., Dry Branch, Ga.) was then blended into the zeolite slurry. To the zeolite and clay slurry, sufficient phosphoric acid (J. T. Baker Co., Phillipsburg, N.J.) was added to result in a phosphorus level of 1.9 wt. % on the finished catalyst. A silica-alumina binder was then added to the slurry by first adding colloidal silica (Nalco 1034A, Nalco Chemical Co., Chicago, Ill.) and then alumina (Condea Pural, SBIII pseudoboehmite alumina, Condea Chemie GMBH, Hamburg, Germany) peptized with formic acid. The matrix contains about 50 wt. % clay and about 50 wt. % binder and the binder contains about 5 parts by weight silica and about 1 part by weight alumina. The resulting slurry was spray dried (Niro Inc., Columbia, Md., spray dryer) at an outlet temperature of 360° F. The spray dried material was calcined for two hours at 1,000° F. in air. The resulting catalyst is designated Catalyst D and has the following properties:

| Phosphorus content, Wt. % | 1.9 |
|---|---|
| Alpha activity | 51 |

Example 5

A phosphorus modified fluid catalyst containing 25 wt. % zeolite MCM-22 was prepared by first making a slurry of zeolite MCM-22. The zeolite slurry was prepared by pre-calcining zeolite MCM-22 for 3 hours at 900° F. in nitrogen and then ballmilling the calcined zeolite for 16 hours at 25% solids with deionized water (DI) and using 0.6 wt. % dispersant (Marasperse N-22). Kaolin clay (Kaopaque 10S, a Georgia kaolin clay) was then blended into the zeolite slurry. To the zeolite and clay slurry, sufficient ammonium dihydrogen phosphate (Sigma-Aldrich Corp., Milwaukee, Wis.) was added to result in a phosphorus level of 1.6 wt. % on the finished catalyst. A silica-alumina binder was then added to the slurry by first adding colloidal silica (Nalco 1034A) and then alumina (Condea Pural, SBIII pseudoboehmite alumina) peptized with formic acid. The matrix contains about 50 wt. % clay and about 50 wt. % binder composed of about 5 parts by weight silica and about 1 part by weight alumina. The resulting slurry was spray dried at an outlet temperature of 360° F. The spray dried material was calcined for two hours at 1,000° F. in air. The resulting catalyst is designated Catalyst E and has the following properties:

| Phosphorus content, Wt. % | 1.6 |
|---|---|
| Alpha activity | 50 |

Example 6

A catalyst compositionally similar to the catalysts prepared in Examples 4 and 5 was prepared without the use of phosphorus by mixing the silica-alumina binder (Nalco 1034A silica and Condea Pural SBIII pseudoboehmite alumina, peptized with formic acid), and subsequently adding the kaolin clay (Kaopaque 10S) and then the ballmilled zeolite slurry. The ballmilled zeolite slurry was prepared by precalcining zeolite MCM-22 for 3 hours at 900° F. in nitrogen and ballmilling the calcined zeolite for 16 hours at 25% solids with deionized water (DI) and 0.6 wt. % dispersant (Marasperse N-22). The matrix contains about 50 wt. % clay and about 50 wt. % binder compsed of about 5 parts by weight silica and about 1 part by weight alumina. The resulting slurry was spray dried at an outlet temperature of 360° F. The spray dried material was calcined for 2 hours in air at 1,000° F. The resulting catalyst is designated Catalyst F and has the following properties:

| Phosphorus content, Wt. % | 0 |
|---|---|
| Alpha activity | 72 |

A comparison of the properties of the catalysts of Examples 4, 5, and 6 shows that the incorporation of phosphorus into the catalyst composition initially decreases the alpha activity of the catalyst.

Example 7

Three identical samples of the calcined catalyst of Example 4 were treated in 100% steam at 1,000° F. at atmospheric pressure for either 2, 5, or 10 hours. These steam treated catalysts are designated Catalysts G, H, and I and have the following properties:

| Catalyst Designation | Steaming Time, hrs | Phosphorus Content, wt. % | Alpha Activity |
|---|---|---|---|
| G | 2 | 1.9 | 30 |
| H | 5 | 1.9 | 26 |
| I | 10 | 1.9 | 16 |

Example 8

Three identical samples of the calcined catalyst of Example 5 were treated in 100% steam at 1,000° F. at atmospheric pressure for either 2, 5, or 10 hours. These steam treated catalysts are designated Catalysts J, K, and L and have the following properties:

| Catalyst Designation | Steaming Time, hrs | Phosphorus Content, wt. % | Alpha Activity |
|---|---|---|---|
| J | 2 | 1.6 | 29 |
| K | 5 | 1.6 | 26 |
| L | 10 | 1.6 | 17 |

A comparison of the alpha activities of the catalysts of Examples 7 and 8 shows that the incorporation of phosphorus into the catalyst via either phosphoric acid or ammonium dihydrogen phosphate results in a similar response of alpha as a function of steaming time.

Example 9

Three identical samples of the calcined catalyst of Example 6 were treated in 100% steam at 1,000° F. at atmospheric pressure for either 2, 5, or 10 hours. These steam treated catalysts are designated Catalysts M, N, and O and have the following properties:

| Catalyst Designation | Steaming Time, hrs | Phosphorus Content, wt. % | Alpha Activity |
|---|---|---|---|
| M | 2 | 0 | 10 |
| N | 5 | 0 | 8 |
| O | 10 | 0 | 3 |

A comparison of the alpha activities of the catalysts presented in Example 9 with those presented in Examples 7 and 8 shows that the incorporation of phosphorus into the catalyst composition improves the hydrothermal stability of the catalyst. The catalysts prepared according to Examples 4 and 5 have a higher alpha activity after exposure to steam than the catalyst prepared according to Example 6.

The alpha activity data presented in Examples 4 through 9 are shown graphically in the figure.

Example 10

A phosphorus modified fluid catalyst was prepared by first ammonium exchanging as-synthesized (containing the organic directing agent) MCM-22 with 1N NH₄NO₃, 25 cc/g wet cake. Then a zeolite slurry was prepared by ballmilling the zeolite for 16 hours at 8.8 % solids with deionized water (DI) and using 0.6 wt. % dispersant (Marasperse N-22) and kaolin clay (Thiele RC-32, Thiele Kaolin Co., Sandersonville, Ga.) was added to the zeolite slurry. Next, phosphoric acid was added to the slurry to result in a phosphorus level of 2.8 wt. % on the finished catalyst. A silica-alumina binder was then added to the slurry by first adding colloidal silica and then alumina (Condea Pural, SBIII pseudoboehmite alumina) peptized with formic acid. The resulting slurry (18 wt. % solids) was spray dried at an outlet temperature of 350° F. The spray dried material was calcined for two hours at 1,000° F. in air. The resulting catalyst is designated Catalyst P and includes about 40 wt. % zeolite. The matrix contains about 50 wt. % clay and about 50 wt. % binder and has a binder silica-alumina ratio of about 5:1.

Example 11

A phosphorus modified fluid catalyst was prepared by first ammonium exchanging as-synthesized (containing the organic directing agent) MCM-22 with 1N NH₄NO₃, 25 cc/g wet cake. Then the zeolite was nitrogen precalcined for 3 hours at 900° F. Next, a zeolite slurry was prepared by ballmilling the zeolite for 16 hours at 23% solids with deionized water (DI) and using 0.6 wt. % dispersant (Marasperse N-22) and kaolin clay (Kaopaque 10S) was added to the zeolite slurry. Phosphoric acid was added to the slurry to result in a phosphorus level of 3.1 wt. % on the finished catalyst. A silica-alumina binder was then added to the slurry by first adding colloidal silica and then alumina (Condea Pural, SBIII pseudoboehmite alumina) peptized with formic acid. The resulting slurry (28 wt. % solids) was spray dried at an outlet temperature of 350° F. The spray dried material was calcined for two hours at 1,000° F. in air. The resulting catalyst is designated Catalyst Q and includes about 40 wt. % zeolite. The matrix contains about 50 wt. % clay and about 50 wt. % of binder and has a binder silica-alumina ratio of about 5:1.

Example 12

A phosphorus modified fluid catalyst was prepared by first ammonium exchanging as-synthesized (containing the organic directing agent) MCM-22 with 1N NH₄NO₃, 25 cc/g wet cake. Then the zeolite was hybrid calcined (e.g., nitrogen precalcined for 3 hours at 900° F. and then air calcined for 6 hours at 1,000° F.). Next, a zeolite slurry was prepared by ballmilling the zeolite for 16 hours at 30% solids with deionized water (DI) and using 0.6 wt. % dispersant (Marasperse N-22) and kaolin clay (Kaopaque 10S) was added to the zeolite slurry. Phosphoric acid was added to the slurry to result in a phosphorus level of 2.9 wt. % on the finished catalyst. A silica-alumina binder was then added to the slurry by first adding colloidal silica and then alumina (Condea Pural, SBIII pseudoboehmite alumina) peptized with formic acid. The resulting slurry (28 wt. % solids) was spray dried at an outlet temperature of 350° F. The spray dried material was calcined for two hours at 1,000° F. in air. The resulting catalyst is designated Catalyst R and includes about 40 wt. % zeolite. The matrix contains about 50 wt. % clay and about 50 wt. % binder and has a binder silica-alumina ratio of about 5:1.

TABLE 5

MCM-22 Preparation

| Catalyst Property | P As Synthesized | Q Nitrogen Precalcined | R Hybrid Calcined |
|---|---|---|---|
| Attrition Index, AI | 3 | 12 | 3 |
| Packed Density, g/cc | 0.54 | 0.64 | 0.64 |
| Sodium, ppm | 1,083 | 1,215 | 1,255 |
| Phosphorus, wt. % | 2.8 | 3.1 | 2.9 |
| Surface Area, m²/g | 193 | 153 | 153 |
| Real Density, g/cc | 2.3 | 2.3 | 2.3 |
| Particle Density, g/cc | 0.9 | 1.0 | 1.0 |
| Pore Volume, cc/g | 0.7 | 0.6 | 0.6 |
| Sorption Capacities, g/100 g | | | |
| Water | 9.2 | 7.9 | 7.0 |
| n-Hexane | 6.0 | 4.1 | 3.0 |
| Cyclohexane | 6.0 | 4.9 | 4.2 |
| Hydrothermal Stability, Alpha | | | |
| Calcined | 54 | 46 | 8[1] |
| Steamed @ 1,000° F. 2 hours | 32 | 27 | 14 |
| Steamed @ 1,000° F. 5 hours | 25 | 20 | 8 |
| Steamed @ 1,000° F. 10 hours | 21 | 11 | 6 |
| Steamed @ 1,450° F. 10 hours (45% H₂O, 0 psig) | 8 | 4 | 3 |

Note:
1. Upon retesting, this calcined catalyst sample had an alpha activity of 16.

As shown in Table 5, above, the use of hybrid calcined (Catalyst R) or as-synthesized (Catalyst P) MCM-22 resulted in better attrition resistance (lower AI) than the use of nitrogen precalcined MCM-22. Packed density suffered, however, for the as-synthesized catalyst. This catalyst (Catalyst P) also had greater surface area, higher sorption capacities, and a lower particle density than the other two catalysts (Catalysts Q and R). After prolonged steaming time, the nitrogen precalcined (Catalyst Q) or as-synthesized (Catalyst P) catalysts had higher alpha activity than the non-phosphorus containing (Catalysts M, N, and O) and hybrid-calcined (Catalyst R) catalysts.

Example 13

A phosphorus modified fluid catalyst was prepared by first nitrogen precalcining (3 hours at 900° F.) as-synthesized (still containing organic directing agent) MCM-22. Next, a zeolite slurry was prepared by ballmilling the zeolite for 16 hours at 25 % solids with deionized water (DI) and using 0.6 wt. % dispersant (Marasperse N-22) and kaolin clay (Kaopaque 10S) was added to the zeolite slurry. Phosphoric acid was added to the slurry to result in a phosphorus level of 1.9 wt. % on the finished catalyst. A silica-alumina binder was then added to the slurry by first adding colloidal silica and then alumina (Condea Pural, SBIII pseudoboehmite alumina) peptized with formic acid. The resulting slurry was immediately spray dried at an outlet temperature of 350° F. The spray dried material was calcined for two hours at 1,000° F. in air. The calcined material was steam deactivated at 1,450° F. for 10 hours in 45% steam at atmospheric pressure. The resulting catalyst composition is designated Catalyst S and includes about 25 wt. % zeolite. The matrix contains about 50 wt. % clay and about 50 wt. % binder and has a binder silica-alumina ratio of about 5:1. A control catalyst used in the present study was a rare earth Y type zeolite (REY) catalyst removed from a commercial FCC unit following oxidative regeneration and is designated Catalyst T. Two additional catalysts were prepared for fixed fluidized bed (FFB) testing from Catalyst S and Catalyst T. Catalyst U was prepared from 2 wt. % Catalyst S and 98 wt. % Catalyst T. Catalyst V was prepared from 25 wt. % Catalyst S and 75 wt. % Catalyst T. These cataysts were FFB tested at 960° F. for 1 minute using a sour heavy gas oil having the properties shown in Table 6. The results of the FFB testing (after interpolation at 70% conversion) are shown in Table 7.

TABLE 6

| Charge Stock Property | Sour Heavy Gas Oil |
|---|---|
| Pour point, °F. | 95 |
| CCR, wt. % | 0.56 |
| Kinematic viscosity, cs @ 40 C | 104.8 |
| Kinematic viscosity, cs @ 100 C | 7.95 |
| Aniline point, °F. | 168.5 |
| Bromine number | 6.9 |
| Gravity, API | 20.1 |
| Carbon, wt. % | 85.1 |
| Hydrogen, wt. % | 12.3 |
| Sulfur, wt. % | 2.6 |
| Nitrogen, wt. % | 0.2 |
| Basic nitrogen, ppm | 465 |
| Nickel, ppm | 0.5 |
| Vanadium, ppm | 0.3 |
| Iron, ppm | 1.2 |
| Copper, ppm | <0.1 |
| Sodium, ppm | 0.8 |

TABLE 7

Effect of MCM-22 with Phosphorus on Catalytic Performance
Yield Shifts at 70 vol. % conversion

| | Control | Delta Yields | |
|---|---|---|---|
| Catalyst | T | U | V |
| Zeolite | REY | MCM-22 | MCM-22 |
| Percent Additive in Blend | 0% | 2% | 25% |
| $C_5^+$ Gasoline, vol. % | 52.4 | (1.7) | (7.4) |
| $C_4$'s, vol. % | 14.6 | 0.5 | 3.8 |
| $C_3$'s, vol. % | 10.5 | 1.6 | 3.7 |
| $C_2^-$, wt. % | 3.3 | (0.2) | — |
| Coke, wt. % | 7.0 | (0.1) | 1.0 |
| $C_3^=$, vol. % | 7.2 | 0.7 | 3.1 |
| $C_4^=$, vol. % | 5.5 | 0.2 | 1.4 |
| $C_5^=$, vol. % | 3.7 | (0.8) | |
| Potential Alkylate, vol. % | 21.0 | 1.5 | 7.5 |
| RON, $C_5^+$ Gasoline | 91.5 | (1.0) | 1.3 |

( ) denotes a negative value

While there have been described what are presently believed to be typical embodiments of the invention, those skilled in the art will realize that changes and modifications may be made thereto without departing from the spirit of the invention and it is intended to claim all such changes and modifications as fall within the true scope of the invention.

We claim:

1. A composition comprising:

a porous crystalline material characterized by an X-ray diffraction pattern including values substantially as set forth in Table 1 of the specification wherein said crystalline material has been treated with a source of phosphorus selected from the group consisting of ammonium monohydrogen phosphate, ammonium dihydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite, phosphoric acid and mixtures thereof.

2. The composition according to claim 1 further comprising a matrix material.

3. The composition of claim 1 wherein said crystalline material has the molar relationship $$X_2O_3:(n)YO_2,$$

wherein n is at least about 10, X is a trivalent element and Y is a tetravalent element.

4. The composition comprising the product of thermal treatment of the composition of claim 1 at a temperature up to about 925° C. in the presence or absence of steam.

5. The composition of claim 1 further comprising the porous crystalline material having been contacted in its as-synthesized form with the source of phosphorus.

6. The composition of claim 1 wherein the porous crystalline material is treated with the source of phosphorus after having been heated to a temperature in the range of from about 100° C. to about 595° C. in a nitrogen atmosphere for between about 30 minutes to about 48 hours.

7. The composition of claim 1 wherein the porous crystalline material is treated with the source of phosphorus after having first been heated to a temperature in the range of from about 100° C. to about 595° C. in a nitrogen atmosphere for between about 30 minutes to about 48 hours and subsequently having been thermally treated in air at a temperature of up to about 925° C.

8. The composition of claim 1 further comprising at least one additional component selected from the group consisting of a large pore zeolite, a mesoporous material and mixtures thereof.

9. The composition of claim 1 wherein the phosphorus content is greater than about 0.1 wt. %.

10. A method for manufacture of a catalyst composition comprising the steps of:

(a) modifying a porous crystalline material characterized by an X-ray diffraction pattern including values substantially as set forth in Table 1 of the specification by contacting said porous crystalline material with a source of phosphorus, the source of phosphorus being selected from the group consisting of ammonium monohydrogen phosphate, ammonium dihydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite, phosphoric acid and mixtures thereof; and (b) forming a catalyst particle from the phosphorus modified porous crystalline material.

11. A method according to claim 10 comprising adding a matrix material to the porous crystalline material and contacting either the porous crystalline material alone or the porous crystalline material and the matrix material with the source of phosphorus prior to forming the catalyst particle.

12. A method according to claim 10 wherein the porous crystalline material has the molar relationship $$X_2O_3:(n)YO_2,$$

wherein n is at least about 10, X is a trivalent element and Y is a tetravalent element.

13. A method according to claim 10 further comprising thermally treating the formed particle at a temperature up to about 925° C. in the presence or absence of steam.

14. The composition prepared according to the method of claim 10.

15. A method for manufacture of a catalyst composition comprising the steps of:
   (a) combining a porous crystalline material characterized by an X-ray diffraction pattern including values substantially as set forth in Table 1 of the specification and a source of phosphorus selected from the group consisting of ammonium monohydrogen phosphate, ammonium dihydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite, phosphoric acid and mixtures thereof, and at least one of a source of clay, a source of alumina, a source of silica and mixtures thereof; and
   (b) forming catalyst particles from the combination.

16. A method for manufacture of a composition according to claim 15 further comprising the steps of:
   (a) preparing a slurry of the porous crystalline material characterized by an X-ray diffraction pattern including values substantially as set forth in Table 1 of the specification and the source of phosphorus and at least one of the source of clay, the source of silica, the source of alumina, and mixtures thereof; and
   (b) forming catalyst particles from said slurry.

17. A method according to claim 15 further comprising thermally treating the formed particles at a temperature of up to about 925° C. in the presence or absence of steam.

18. The composition prepared according to the method of claim 15.

19. The method according to claim 16 wherein the porous crystalline material comprises MCM-22 and wherein step (a) of claim 18 comprises:
   (i) first, combining into a slurry the MCM-22 and the source of clay;
   (ii) then, adding the source of phosphorus to the slurry; and
   (iii) then, adding at least one of the source of alumina, the source of silica, and combinations thereof to the slurry.

20. A catalyst composition comprising:
   MCM-22 that has been heated to a temperature in the range of from about 100° C. to about 595° C. in a nitrogen atmosphere for between about 30 minutes to about 48 hour and then has been combined with a source of phosphorus selected from the group consisting of ammonium monohydrogen phosphate, ammonium dihydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite, phosphoric acid and mixtures thereof.

21. The catalyst composition of claim 20 wherein the MCM-22 has been thermally treated in air up to a temperature of about 925° C. after having been heated in the nitrogen atmosphere and before being combined with the source of phosphorus.

22. A method of preparing a catalyst composition comprising the steps of:
   (a) heating MCM-22 in a nitrogen atmosphere to a temperature of between about 100° C. to about 595° C. for between about 30 minutes and about 48 hours to thereby produce a nitrogen precalcined MCM-22;
   (b) combining the MCM-22 prepared according to step (a) with a source of phosphorus and, optionally, a source of clay, a source of silica, a source of alumina, or combinations thereof, the source of phosphorus being selected from the group consisting of ammonium monohydrogen phosphate, ammonium dihydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite, phosphoric acid and mixtures thereof; and
   (c) forming a catalyst particle from the combination of step (b).

23. The method according to claim 21 wherein step (a) further comprises heating the nitrogen precalcined MCM-22 in air to a temperature up to about 925° C. for about 1 minute up to about 20 hours.

24. A method for manufacture of a catalyst composition from MCM-22, a source of phosphorus and, optionally, a source of clay, a source of alumina, a source of silica, or combinations thereof, the method being selected from the group consisting of:
   (a) first, combining MCM-22 and a source of clay into a slurry, then adding a source of phosphorus selected from the group consisting of ammonium monohydrogen phosphate, ammonium dihydrogen phosphate, triammonium phosphate, ammonium hypophosphate, ammonium orthophosphate, ammonium dihydrogen orthophosphate, ammonium monohydrogen orthophosphate, ammonium hypophosphate, ammonium dihydrogen orthophosphite, phosphoric acid and mixtures thereof to the slurry and, optionally, adding a source of alumina, a source of silica, or combinations thereof to the slurry, and finally, forming the slurry into catalyst particles;
   (b) first, combining MCM-22 and a source of phosphorus selected from the group consisting of ammonium monohydrogen phosphate, ammonium dihydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite, phosphoric acid and mixtures thereof into a slurry, then, optionally adding a source of clay, a source of alumina, a source of silica, or combinations thereof to the slurry, and finally, forming the slurry into catalyst particles; and
   (c) first, combining MCM-22 and at least one of a source of clay, a source of alumina, a source of silica, and combinations thereof into a slurry, then forming the slurry into catalyst particles, and finally, contacting the formed catalyst particles with a source of phosphorus selected from the group consisting of ammonium monohydrogen phosphate, ammonium dihydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite, phosphoric acid and mixtures thereof.

\* \* \* \* \*